May 26, 1942. H. I. MORRIS 2,283,940
WELDING APPARATUS
Filed Sept. 5, 1939 3 Sheets-Sheet 1

INVENTOR
HOWARD I. MORRIS
BY
Geo. B. Pitts
ATTORNEY

May 26, 1942. H. I. MORRIS 2,283,940
WELDING APPARATUS
Filed Sept. 5, 1939 3 Sheets-Sheet 2

INVENTOR
HOWARD I. MORRIS
BY
ATTORNEY

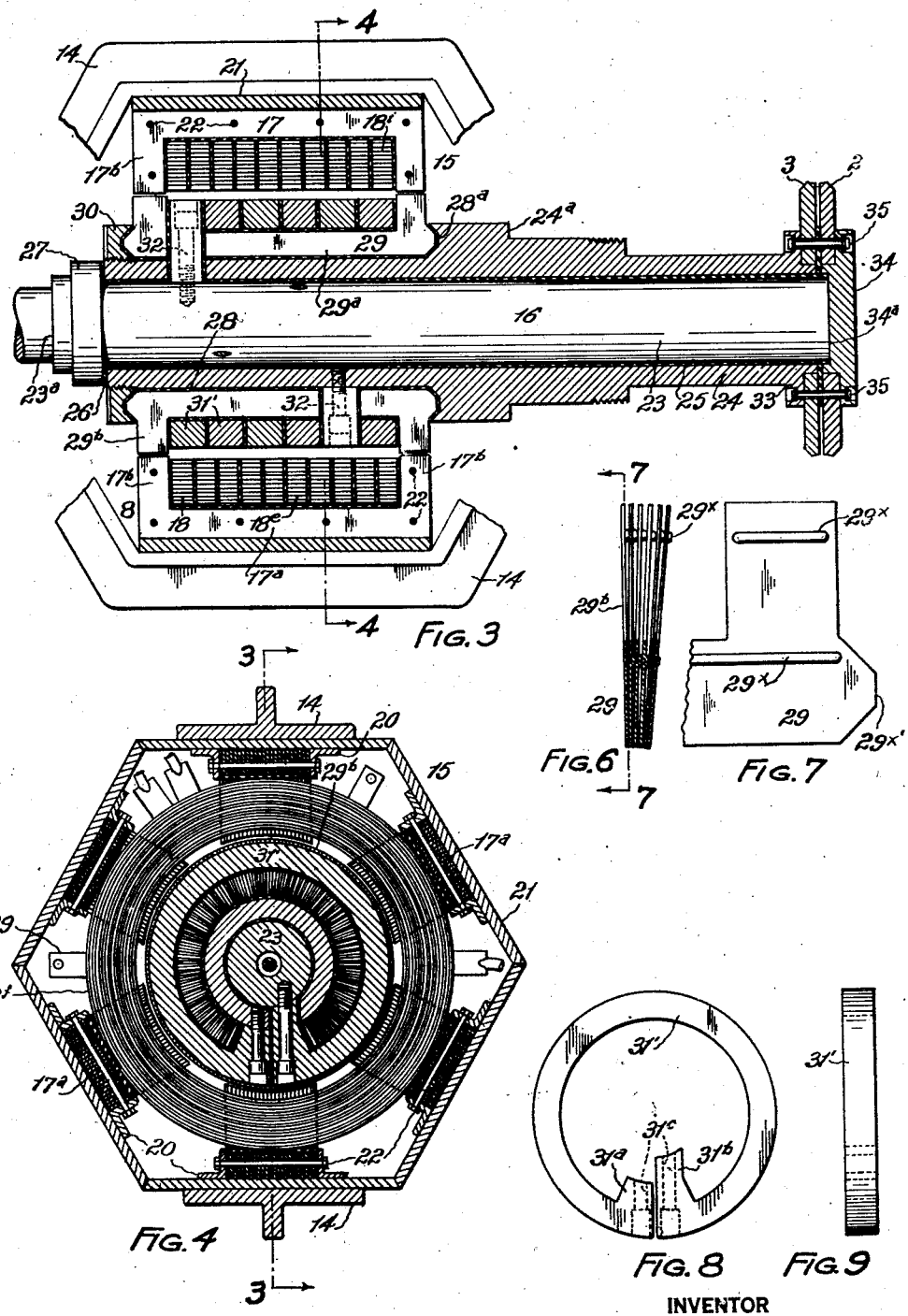

Patented May 26, 1942

2,283,940

UNITED STATES PATENT OFFICE 2,283,940

WELDING APPARATUS

Howard I. Morris, Lakewood, Ohio, assignor of one-third to Carl M. Yoder and one-third to Harvey O. Yoder, both of Lakewood, Ohio Application September 5, 1939, Serial No. 293,445

10 Claims. (Cl. 219—6)

This invention relates to welding apparatus having rotatable electrodes, more particularly a welding apparatus wherein the electrodes and the transformer constitute a unitary structure.

In all transformers utilized in welding apparatus employing rotatable electrodes, of which I have knowledge, it has been necessary to provide a plurality of brushes between the secondary winding or windings and the rotatable electrodes or where the transformer rotated with the electrodes, to provide a plurality of brushes between the primary coils or windings and the current supply mains, so that a large number of parts, to provide for these brushes, the adjustment thereof and regulation of the voltage was required.

One object of the invention is to provide an improved transformer having its secondary winding electrically connected to rotatable electrodes, but wherein brushes or equivalent devices are entirely eliminated.

Another object of the invention is to provide an improved transformer having stationarily mounted primary windings and a rotatable secondary winding, whereby the latter may be directly connected to rotatable electrodes for welding and the ratio of the primary windings to the secondary winding may be readily changed to adjust the voltage or welding current.

Another object of the invention is to provide an improved transformer wherein the secondary winding rotates relative to the primary winding and the secondary winding consists of a plurality of rings the terminals of each of which are so disposed, relative to the terminals of each of the remaining rings angularly of its axis that the current induced in and flowing from the secondary winding is devoid of fluctuations.

Another object of the invention is to provide an improved transformer having few parts of simple construction and readily assembled.

A further object of the invention is to provide an improved transformer having a rotatable secondary winding connected to rotatable welding electrodes wherein provision is readily made for mounting the electrodes and secondary winding for rotation as a unit and the electrodes are connected in a simple manner to the terminals of the secondary winding.

Other objects of the invention will be apparent to those skilled in the art to which my invention relates from the following description taken in connection with the accompanying drawings, wherein Fig. 1 is a sectional view of an apparatus substantially on the line 1—1 of Fig. 2, embodying my invention.

Fig. 3 is a section on the line 3—3 of Fig. 4.

Fig. 4 is a section on the line 4—4 of Figs. 1 and 3.

Fig. 6 is a fragmentary section of the core for the secondary member on the 4—4 of Figs. 1 and 3, enlarged.

Fig. 7 is a detail view on the line 7—7 of Fig. 6.

Fig. 8 is a fragmentary view of one of the rings constituting the secondary winding.

Fig. 9 is an elevation of the part shown in Fig. 8.

Fig. 10 is a diagram of the circuits.

Figure 1:
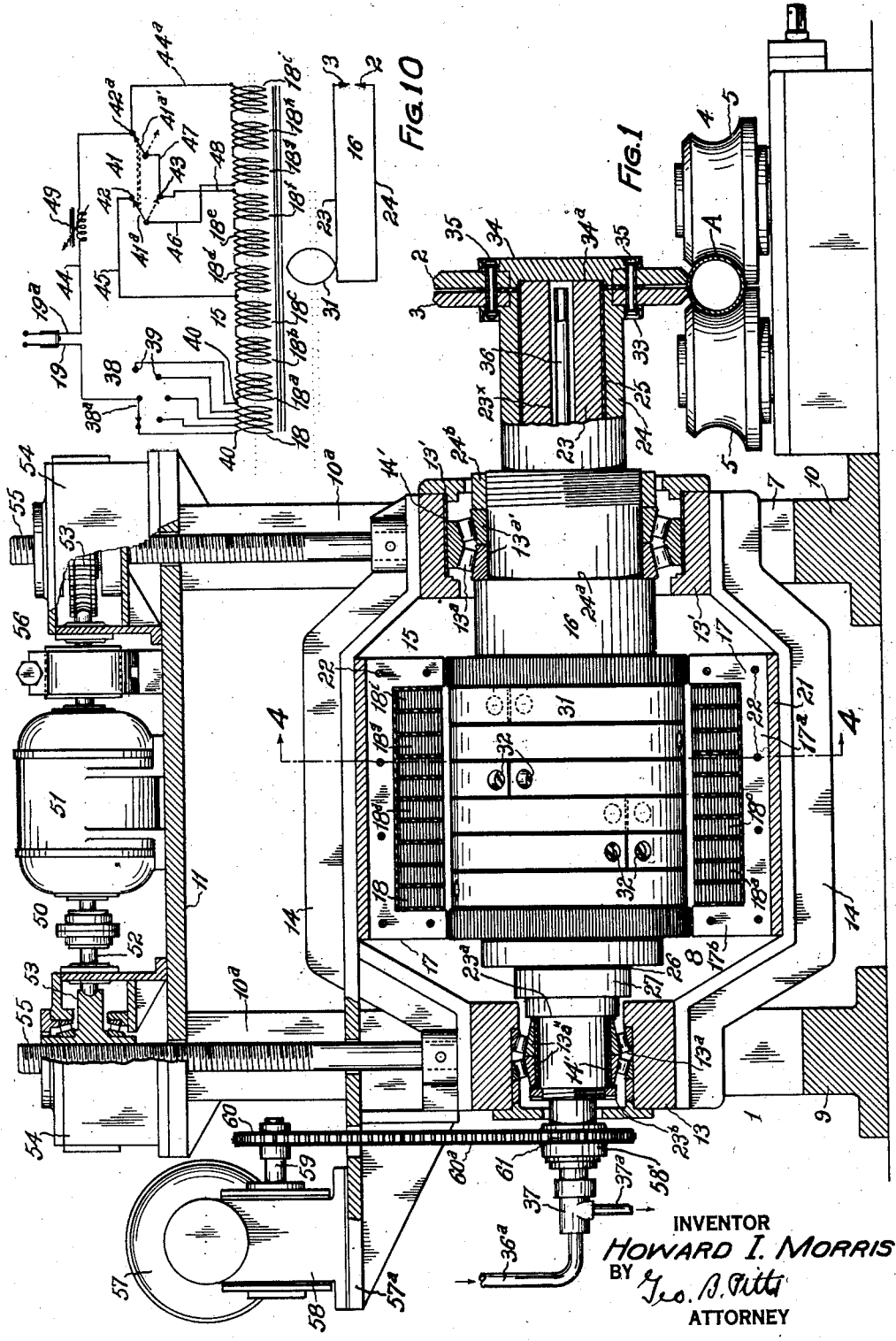
Figure 2:
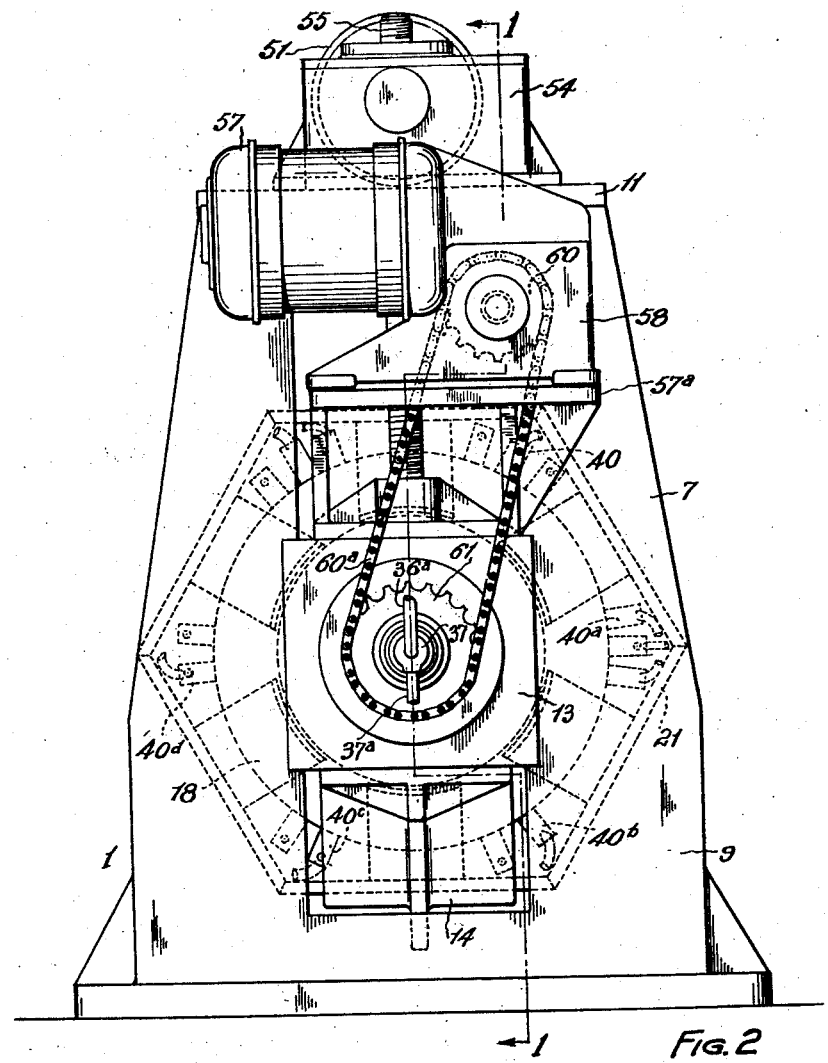
Fig. 2 is an end elevation looking towards the right of Fig. 1.

In the drawings, 1 indicates a welding apparatus having disc electrodes 2, 3, and 4 indicates a mechanism for feeding the work A to be welded. The work A shown merely for illustrative purposes consists of piping which is engaged by one or more pairs of rolls 5, 5 of the mechanism 4 (only one pair being shown), to maintain its side edges in position to be welded. Certain of the pipe engaging rolls are mounted on suitably supported shafts arranged to be driven by a power means (not shown) so as to feed the pipe endwise.

Figure 5:
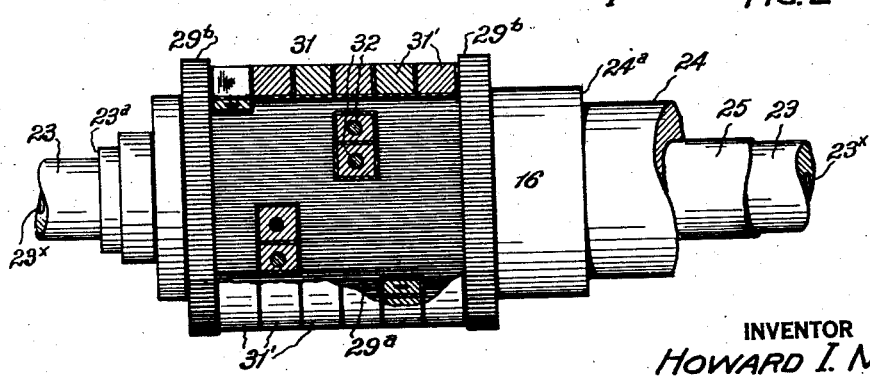
Fig. 5 is a fragmentary view of the secondary member, with parts broken away.

The welding apparatus 1 consists of a frame 7 arranged to movably support a transformer indicated as an entirety at 8, whereby the electrodes 2, 3, which are carried by the secondary member of the transformer, may be adjusted relative to the pipe A to accommodate the electrodes 2, 3, to different sizes of pipe and to insure adequate frictional contacts of the electrodes with the work, since the movement of the latter is relied upon through such contact to rotate the secondary member of the transformer. The frame 7 consists of spaced standards 9, 10, which may be supported on a suitable base member and preferably connected at their upper ends by a cross member 11. The standards 9, 10, are formed with alined openings 10a the walls of which form guides for boxes 13, 13', which movably carry the primary and secondary members constituting the transformer 8, and electrodes 2, 3, whereby these parts may be raised and lowered for the purposes already set forth. The upper sides and lower sides of the boxes 13, 13', are rigidly connected together by frame members 14, 14, the intermediate portions of which are bowed outwardly to accommodate the transformer 8 and serve as a support for the primary member, indicated as an entirety at 15. The boxes 13, 13' are provided with suitable antifriction bearings 13a, which rotatably support the secondary member, indicated as an entirety at 16. The secondary member 16 is insulated from the frame members 14 by the layer of insulation material 14' between the outer bearing race 13a' and the walls of the adjacent box 13' and a layer of insulation material 14' between the inner bearing races 13a'' and the clamping nut therefor and the adjacent end of the secondary member 16 to prevent a flow of current through the members 14 due to the opposite polarity of those portions of the secondary member which are mounted in the bearings 13a. The primary member 15 consists of a plurality of cores 17 uniformly spaced about the transformer axis, each core being formed of steel laminations shaped to form a bottom portion 17a and inwardly extending end portions 17b, and a plurality of windings fitting within the end portions 17b and windings fitting within the end portions of the cores against the bottom 17a thereof. For illustrative purposes I provide ten windings 18, 18a, 18b, 18c, etc., each formed of copper tape. Each winding is suitably insulated from each other winding and the core portions 17a, 17b. The primary windings are connected to supply mains 19, 19a, in the manner hereinafter set forth. The laminations forming each core 17 are positioned between a pair of angles 20, which are suitably secured to the inner sides of a shell member 21, preferably of hexagonal shape, the upper and lower sides of which fit between and are suitably secured to the bowed portions of the frame members 14, 14. The laminations of each core are secured together by suitable bolts 22, certain of which extend through the angles 20 to secure the cores thereto. The secondary member 16 surrounds, and the terminals of its winding are connected to, the inner and outer concentrically related conductors 23, 24, suitably insulated from each other and rigidly connected to the electrodes 2, 3, respectively, the inner conductor 23 being extended beyond that end of the outer conductor 24 remote from the electrodes 2, 3, for mounting in the bearings 13a in the box 13 and the outer conductor member 24 being mounted in the bearings 13a in the box 13', whereby the secondary winding, the electrodes and the conductors from the winding to the electrodes rotate as a unitary structure. The conductors 23, 24, are preferably formed of copper and are insulated from each other by a sleeve 25 of insulation of material and an annulus 26 of the same material between a collar 27 provided on the inner member 23 to serve as an abutment against which the adjacent end of the outer member is secured as later set forth. The extended end portion of the inner member 23 is reduced to form a shoulder 23a against which the adjacent bearing races are held by a nut 23b. The outer member 24 is reduced to provide a shoulder 24a against which the adjacent bearing races are held by a nut 24b. That outer portion of the member 24 which extends through the transformer is cut away as shown at 28 to accommodate a core 29, which surrounds the outer member 24. The core 29 consists of steel laminations formed with suitable struck-up portions 29x to form spacers between them so that the laminations will be uniformly disposed radially circumferentially of the outer member 24. The core 29 is secured against the end wall 28a of the cut-away 28 by a nut or collar 30 threaded on the adjacent end of the outer member 24. The end wall 28a and inner face of the nut 30 are formed with alined circumferential recesses to receive lateral projections or wings 29x' on the opposite ends of the laminations. The secondary winding, indicated as an entirety at 31, may be wound in any desired manner, but in the illustrated form it extends circumferentially of the transformer axis. In this arrangement the laminations forming the core 29 are shaped to form a bottom portion 29a and outwardly extending side portions 29b, which aline with the side portions 17b of the cores 17, the secondary winding 31 fitting between the side portions 29b and surrounding the bottom portion 29a and suitably insulated from such portions as shown in Fig. 3. The secondary winding 31 preferably comprises a plurality of ring-like members 31' formed of copper and arranged in side-by-side relation between the core side portions 29b and suitably insulated from each other, the opposite ends of each member 31' being closely related, so that the member will be substantially continuous. The opposite ends of each member 31' are provided with inwardly extending lugs 31a, 31b, the lug 31a engaging the outer member 24 to provide an electrical connection therewith and the lug 31b extending through an opening formed in the outer conductor member 24 (but suitably insulated from the walls of said opening) and engaging the inner conductor member 23 to provide an electrical connection therewith. Each of the ring ends and the adjacent lug are formed with a through opening 31c to receive a screw 32, the inner end of which is threaded into the adjacent conductor member to rigidly secure the lug thereto and insure the electrical connection from the ring to said member. As will be understood from Figs. 1 and 5, the ring-like members 31' are so arranged that the connections of their ends with the conductor member 23 are at different points circumferentially thereof, that is, the pairs of terminal lugs 31a, 31b, are uniformly spaced around the conductor member 23, such arrangement serving to eliminate fluctuations in the secondary current.

The electrodes 2 and 3 are mounted on the outer ends of the conductor members 23, 24, and electrically connected thereto, respectively, such mounting for illustrative purposes being as follows: the conductor member 24 adjacent its outer end is provided with an integral collar or flange 33 and preferably that portion of the member outwardly of the collar is reduced, the reduced end and collar 33 forming a seat for the inner circumferential wall of the electrode 3, so that the electrode 3 has electrical contact with the conductor 24. A cap 34 formed with a centrally disposed recess 34a on its inner face, fits over and seats on the outer end of the conductor member 23, the bottom wall of the recess being in electrical contact with the outer end thereof, and its side wall is cut away circumferentially to form a seat for the inner circumferential wall of the electrode 2, so that the electrode 2, through the cap 34, has electrical connection with the conductor 23. The electrodes are insulated from each other and the cap 34 is insulated from the conductor member 24 by an annular disk formed of suitable insulation material. The cap 34 and electrodes 2, 3, are rigidly supported in their seats and in fixed relation to each other by a plurality of bolts 35 which extend through the collar 33, electrodes 3, 2, and cap 34, within suitable sleeves flanged at their opposite ends and formed of suitable insulation material so as to insulate the bolts, their heads and the nuts thereon from these parts.

The inner conductor member 23 is formed with a through opening 23x to receive a pipe 36 which supplies a cooling medium (such as water) to the outer end of the member as shown in Fig. 1, the supply pipe being of a size to permit the medium to flow through the opening to a coupling 37 to which a discharge pipe 37a is connected. The pipe 36 extends through the coupling 37 and is connected to a supply pipe 36a.

The primary windings 18, 18a, 18b, etc., may be connected to the supply mains 19, 19a, in any desired manner; also, by the provision of suitable switches or cut-outs the ratio of the primary windings to the secondary winding may be changed at will, to insure any predetermined heat effect for welding, one arrangement, by way of example, being shown in Fig. 10 to which reference is made as follows: 38 indicates a switch of any standard or preferred form of construction having a movable arm 38a connected to the main 19 and a plurality of terminals 39, connected by leads to taps, one for each lead, leading from one of the primary windings, as indicated at 40. 41 indicates a switch for controlling the connection of the main 19a to other primary windings. The switch 41 consists of two connected arms 41a, 41a', which in one position engage terminals 42, 42a, respectively, and in another position the arm 41a engages a terminal 43. A lead 44 connects the main 19a to the terminal 42a and a separate lead 44a connects this terminal to the outer end of winding 18i. A lead 45 connects the terminal 42 to the connection between windings 18c, 18d. A lead 46 connects the switch arm 41a to the inner end of winding 18g. A lead 47 connects the switch arm 41a' to terminal 43 and a lead 48 connects this terminal to the outer end of winding 18f. It will thus be seen that when the switch arms 41a, 41a', are in the position shown in Fig. 10, the windings 18d, 18e, 18f are in parallel relation to the windings 18g, 18h, 18i; and that when the switch arms 41a, 41a', are moved to the position shown in dotted lines all of the windings 18, 18a, 18b, etc., are connected in series. 49 indicates a variable reactance coil connected in the main 19a and arranged to regulate the voltage separately from or supplemental to the regulation resulting from the operation of either or both switches 38, 41, so that the voltage across the electrodes and the resulting heat for welding may be regulated and controlled to secure a proper weld of the work A.

For the purpose of accommodating the electrodes to different kinds of work, for example, pipes of different diameter, the transformer is adjustably supported by a raising and lowering mechanism indicated as an entirety at 50. Of this mechanism, 51 indicates a motor mounted on the cross member 11. The motor shaft is connected at its opposite ends through suitable universal joints or flexible couplings to shafts 52, each of which is provided with a worm (not shown) in mesh with a worm gear 53. The hub of each worm gear 53 is mounted in suitable bearings in a casing 54 mounted on the cross member 11. Each worm gear 53 is formed with an axially disposed threaded opening to receive the threaded portion of a rod 55, the lower end of which is suitably connected to the adjacent end of the upper frame member 14, so that when the worm gears are rotated they serve to move the rods 55 endwise. From the above description it will be seen that the motor 51 is arranged to drive both worm gears 53 simultaneously, their meshing teeth being arranged so that the worm gears rotate in the same direction, and when these gears are driven both ends of the transformer frame are adjusted an equal distance. 56 indicates a suitable magnetically controlled brake for the shaft of the motor 51 serving to hold the shaft stationary when the motor is not running.

The electrodes 2, 3, are preferably provided with peripheries having a cross section complementary to the surfaces of the work and these peripheries are ground or turned from time to time to insure adequate contact with the work. To facilitate this operation on the electrodes without their disassembly, I provide a motor 57, which is mounted on a bracket 57a carried by the upper frame member 14 so as to be movable upwardly and downwardly with the transformer and electrodes when they are adjusted, as already set forth. The motor 57 operates through a suitable reduction gearing within a housing 58 to drive a shaft 59. The shaft 59 is provided with a sprocket 60, which through a chain 60a, drives a sprocket 61 drivingly connected to, but suitably insulated from, the inner end of the conductor member 23. As the conductor members 23, 24, are connected together mechanically, the operation of the motor 57 will rotate the electrodes, so that by the application of a suitable tool their peripheries may be turned whenever necessary. 58' indicates a free running clutch, so that the rotation of the electrodes by the work does not operate the sprocket 61, chain 60a, sprocket 60 and shaft 59. It will be obvious that when found desirable the motor 57 may be utilized to rotate the secondary member so as to rotate the electrodes during welding of the work.

From the foregoing description it will be noted that the primary windings are stationarily mounted so that the supply mains may be readily and economically connected thereto in any desired manner and that the terminals of the secondary winding are connected directly to the electrodes, whereby the secondary winding and the electrodes may rotate as a unit, so that the provision of brushes and their mountings and other fittings are entirely eliminated. It will also be noted that since in the arrangement disclosed, no lines of force are cut by moving conductors, there is no rotative effect on the secondary member.

To those skilled in the art to which my invention relates, many changes in construction and widely differing embodiments and applications of the invention will be apparent without departing from the scope thereof. My disclosures and the description are intended to be purely illustrative and not in any sense limiting.

What I claim is:

1. In welding apparatus, the combination of a stationary support, a single phase transformer, the primary member of said transformer being fixedly mounted on said support, means for rotatably mounting the secondary member of said transformer on said support substantially centrally of the primary member, and disc electrodes fixedly related to said secondary member and electrically connected to the winding of said secondary member and rotatable therewith.

2. In welding apparatus, the combination of a stationary support, a single phase transformer, the primary member of said transformer being fixedly mounted on said support, means for rotatably mounting the secondary member of said transformer on said support substantially centrally of the primary member of said transformer, said secondary member of said transformer having inner and outer concentrically related conductors connected electrically to the winding of said secondary member and rotatable therewith, and electrodes electrically connected to said conductors, respectively, and rotatable therewith.

3. In welding apparatus, the combination of a stationary support having bearings, a single phase transformer, the primary member of the transformer being fixedly mounted on said support, and the secondary member of said transformer being positioned substantially centrally of the primary member and having inner and outer concentrically related conductors connected respectively to the winding of said secondary member and each rotatively mounted in one of said bearings and provided with electrodes in electrical connection with said conductors, respectively.

4. In welding apparatus, the combination of a stationary support having spaced bearings, a single phase transformer mounted between said bearings, the primary member of the transformer being fixedly mounted on said support and the secondary member of said transformer being positioned substantially centrally of the primary member and having conductors electrically connected respectively to the winding of the secondary member of said transformer and each rotatively mounted in one of said bearings and provided with electrodes in electrical connection with said conductors, respectively.

5. In welding apparatus, the combination with a support and work supporting and feeding means, of a single phase transformer, the primary member of said transformer being fixedly mounted on said support and the secondary member of said transformer being positioned substantially centrally of the primary member, electrodes connected electrically to the winding of said secondary member, and means for mounting the secondary member of said transformer and said electrodes on said support for rotation as a unit, with the electrodes adapted to be in frictional engagement with the work, whereby the work rotates the electrodes and the secondary member of said transformer relative to its primary member.

6. In welding apparatus, the combination of a stationary support, a single phase transformer, the primary member of said transformer being fixedly mounted on said support, means for rotatably mounting the secondary member of said transformer on said support, said secondary member having inner and outer concentrically related conductors, the winding of said secondary member comprising a plurality of ring-like members extending circumferentially of and electrically connected to said conductors, and electrodes electrically connected to said conductors, respectively, and rotatable therewith.

7. An apparatus as claimed in claim 6, wherein the connections between said ring-like members and said conductors are uniformly spaced about the axis of said secondary member.

8. An apparatus as claimed in claim 6, wherein the opposite ends of each ring-like member are provided with inwardly extending lugs, one of which is electrically connected to the outer conductor and the other of which extends through the outer conductor and is electrically connected to the inner conductor.

9. In welding apparatus, the combination of a stationary support having spaced bearings, a single phase transformer mounted between said bearings, the primary member of the transformer being fixedly mounted on said support and the secondary member of said transformer being positioned substantially centrally of the primary member of said transformer and having inner and outer concentrically related conductors fixedly and electrically connected respectively to the winding of the secondary member, and electrodes electrically connected to said conductors, the inner one of said conductors being extended at one side of said transformer for mounting in one bearing and both of said conductors being extended at the other side of said transformer for mounting in the other bearing, said electrodes being fixed to and supported on the extended end portions of said conductors for rotation therewith.

10. In welding apparatus, the combination with a support having spaced bearings, a conductor having one end portion rotatably mounted in one of said bearings, a separate conductor insulated from and fixedly related to the opposite end portion of said conductor and rotatably mounted in the other bearing, a single phase transformer disposed between said bearings and having its primary and secondary windings extending circumferentially of said first mentioned conductor, the primary winding of said transformer being fixedly related to said support and the secondary winding of the transformer being fixedly related to said conductors and electrically connected thereto, core laminations disposed radially of the axis of said first mentioned conductor and extending at an angle to said windings, and electrodes electrically connected to said conductors for engaging with work to be welded.

HOWARD I. MORRIS.